US008336088B2

(12) United States Patent
Raj et al.

(10) Patent No.: US 8,336,088 B2
(45) Date of Patent: Dec. 18, 2012

(54) ALIAS MANAGEMENT AND VALUE TRANSFER CLAIM PROCESSING

(75) Inventors: Thanigaivel Ashwin Raj, Foster City, CA (US); Jacob Saul Fuentes, Menlo Park, CA (US); John Tullis, San Francisco, CA (US); Vishwanath Shastry, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/034,449

(22) Filed: Feb. 24, 2011

(65) Prior Publication Data

US 2011/0258686 A1  Oct. 20, 2011

Related U.S. Application Data

(60) Provisional application No. 61/325,809, filed on Apr. 19, 2010, provisional application No. 61/348,524, filed on May 26, 2010, provisional application No. 61/349,473, filed on May 28, 2010.

(51) Int. Cl.
*G06F 7/04* (2006.01)

(52) U.S. Cl. .............................................. 726/6; 726/18

(58) Field of Classification Search ........................ None
See application file for complete search history.

(56) References Cited

U.S. PATENT DOCUMENTS

| 6,786,400 | B1 | 9/2004 | Bucci |
| 7,181,017 | B1 | 2/2007 | Nagel |
| 7,194,437 | B1 | 3/2007 | Britto |
| 7,395,241 | B1 | 7/2008 | Cook et al. |
| 7,401,049 | B2 | 7/2008 | Hobbs |
| 7,610,222 | B2 | 10/2009 | Neofytides |
| 7,765,154 | B2 | 7/2010 | Shah |
| 7,849,005 | B2 * | 12/2010 | Ong ................................ 705/39 |
| 8,010,451 | B1 * | 8/2011 | Nappi ............................ 705/39 |
| 8,156,543 | B2 * | 4/2012 | Wentker et al. .................. 726/3 |
| 2002/0049681 | A1 | 4/2002 | Herreweghen |
| 2004/0098307 | A1 * | 5/2004 | Uehara et al. .................. 705/14 |
| 2005/0246293 | A1 | 11/2005 | Ong |
| 2007/0038560 | A1 * | 2/2007 | Ansley ........................... 705/39 |
| 2007/0179885 | A1 | 8/2007 | Bird |
| 2007/0288371 | A1 * | 12/2007 | Johnson ......................... 705/41 |
| 2008/0133396 | A1 * | 6/2008 | De La Motte .................. 705/37 |
| 2008/0140568 | A1 | 6/2008 | Henry |

(Continued)

FOREIGN PATENT DOCUMENTS

KR  10-2002-0020316 A  3/2002

(Continued)

OTHER PUBLICATIONS

International Search Report and Written Opinion of Nov. 10, 2011 for PCT Patent Application No. PCT/US2011/033114, 10 pages.

(Continued)

*Primary Examiner* — Kaveh Abrishamkar
(74) *Attorney, Agent, or Firm* — Kilpatrick Townsend & Stockton LLP

(57) ABSTRACT

An alias management and value transfer claim processing system is disclosed. A sending entity initiates value transfer identifying a recipient entity using an alias that is unregistered with the system. The value transfer is authorized, but not settled until the recipient entity registers with the system and claims the value transfer. The registered alias can be used for subsequent value transfers.

20 Claims, 8 Drawing Sheets

U.S. PATENT DOCUMENTS

| | | |
|---|---|---|
| 2008/0154773 A1 | 6/2008 | Ranzini |
| 2008/0183831 A1* | 7/2008 | Shi et al. .................. 709/206 |
| 2009/0144193 A1 | 6/2009 | Giordano |
| 2009/0192912 A1* | 7/2009 | Griffin et al. .................. 705/26 |
| 2009/0210704 A1 | 8/2009 | Han et al. |
| 2010/0036770 A1 | 2/2010 | Fourez |
| 2010/0042538 A1 | 2/2010 | Dheer et al. |
| 2010/0318783 A1 | 12/2010 | Raj |
| 2011/0055077 A1 | 3/2011 | French |
| 2011/0258111 A1 | 10/2011 | Raj et al. |

FOREIGN PATENT DOCUMENTS

| | | |
|---|---|---|
| KR | 10-2002-0020316 A2 | 3/2002 |
| WO | WO 2011/133592 A2 | 10/2011 |
| WO | WO 2011/133593 A2 | 10/2011 |
| WO | WO 2011/133594 A2 | 10/2011 |

OTHER PUBLICATIONS

International Search Report and Written Opinion of Oct. 31, 2011 for PCT Patent Application No. PCT/US2011/033111, 10 pages.

International Search Report and Written Opinion for PCT Patent Application No. PCT/US2011/033114 mailed on Nov. 10, 2011, 10 pages.

International Search Report and Written Opinion for PCT Patent Application No. PCT/US2011/033111 mailed on Oct. 31, 2011, 10 pages.

* cited by examiner

ALIAS MANAGEMENT AND VALUE TRANSFER CLAIM PROCESSING

CROSS-REFERENCES TO RELATED APPLICATIONS

The present non-provisional application claims the benefit under 35 U.S.C. §119(e) of U.S. Provisional Patent Application No. 61/325,809, entitled "ALIAS MANAGEMENT FOR VALUE TRANSFER," filed Apr. 19, 2010, of U.S. Provisional Patent Application No. 61/349,473, entitled "VALUE TRANSFER DEVELOPMENT KIT," filed May 28, 2010, and of U.S. Provisional Patent Application No. 61/348,524, entitled "VALUE TRANSFER CLAIM SYSTEM AND METHOD," filed May 26, 2010, the entire disclosure of each of the referenced applications is incorporated herein by reference in their entirety for all purposes.

BACKGROUND

Value transfers enable a sending entity to transfer value to a recipient entity. Traditionally, such value transfers exposed sensitive information in order to identify the recipient entity, such as a credit card number or a recipient name. Some value transfer systems utilize aliases to protect sensitive information. In such systems, a recipient entity registers an alias by which they may be identified. However, alias enabled value transfer systems require that the recipient entity be registered before the alias may be used to receive a value transfer, which reduces the utility of the value transfer system as a whole.

Traditional value transfer systems were also engineered to be stand alone closed systems. Deep integration with third parties and issuers, such as exposing application programming interfaces and distributing software development kits, was not implemented and thus widespread adoption was not facilitated.

Thus, there is a need in the art for an alias management and value transfer claim processing system that addresses the above concerns. Embodiments of the invention address these and other problems, individually and collectively.

BRIEF SUMMARY

Embodiments of the invention disclosed herein include systems, technical architectures of the systems, and methods for an alias management and value transfer claim processing system. An alias management and value transfer claim processing system can be implemented using one or more computer apparatuses and databases.

One embodiment of the invention is directed to a method for receiving a value transfer request message comprising a recipient entity alias, a transfer amount, and a sending entity identifier, determining if the recipient entity alias is registered; and if the recipient entity alias is not registered, sending a registration request message to a recipient entity and sending a hold message to a sending entity issuer to reserve at least the transfer amount from a sending entity source account identified by the sending entity identifier.

Another embodiment is directed to a method comprising upon receiving a response message from the unregistered recipient entity, performing the operations of sending a debit message to the sending entity issuer to debit at least the transfer amount from the sending entity source account and sending a credit message to a recipient entity issuer to credit the transfer amount to a recipient entity destination account.

In a further embodiment, the method further comprises the transfer amount being held in the sending entity source account or an escrow account.

DETAILED DESCRIPTION

Figure 1:
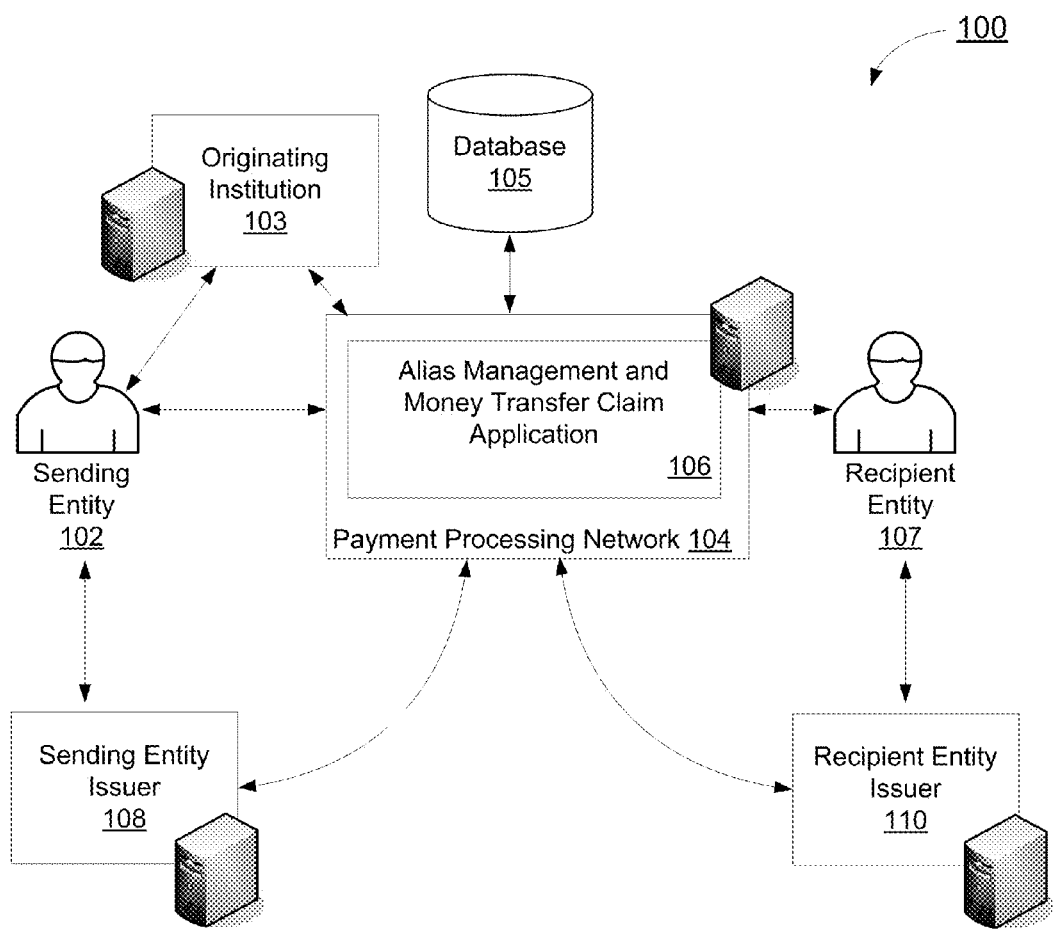
FIG. 1 is an alias management and value transfer claim processing system, according to an example embodiment.

Embodiments of the invention are directed to systems, architectures of the systems, and methods for conducting alias management and value transfer claim processing.

In an example embodiment, an alias management and value transfer claim processing method may comprise receiving a value transfer request message comprising a recipient entity alias, a transfer amount, and a sending entity identifier. Once it is received, the method may continue by determining if the recipient entity alias is registered. If the recipient entity alias is not registered, the method may continue by sending a registration request message to a recipient entity and sending a hold message to a sending entity issuer to reserve at least the transfer amount from a sending entity source account identified by the sending entity identifier. For example, a sending entity may attempt to send $100 to the recipient entity alias "ted@ted.com." If this alias is registered, then a money transfer of $100 may occur in real time. If the alias is not registered, then a message asking the recipient entity may be send to "ted@ted.com" asking him to register in order to receive the money transfer. A message may be sent to the sending entity's bank to place a hold of $100 on the sending entity's account.

In a further embodiment, the method further comprises upon receiving a response message from the recipient entity, performing the operations of sending a debit message to the sending entity issuer to debit at least the transfer amount from the sending entity source account and sending a credit message to a recipient entity issuer to credit the transfer amount to a recipient entity destination account.

As used herein, a "source account" may be a bank account, mobile phone account, online value storage account, or other account from which money or units of value may be transferred. Examples of a source account may include an account holding a digital currency or digital points, a micro-payment account, or a mobile telephone account. A source account may also be an account associated with a portable consumer device, such as a credit card account.

As used herein, a "destination account" may be a bank account, mobile phone account, online value storage account, or other account from which money or units of value may be transferred to. The same type of accounts that comprise of a source account may also be a destination account. In an example embodiment, funds from one type of source account may be transferred to a destination account of a different type.

As used herein, a "portable consumer device" may be a credit card, a debit card, a mobile phone, a pre-paid card, a mobile application, a payment instrument, a specialized application, or any portable device or software application capable of transferring funds. Such devices may include contact or contactless smart cards, ordinary credit or debit cards (with a magnetic strip and without an embedded microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like, where such devices may include an embedded or incorporated contactless chip or similar element. In an example embodiment, a value transfer transfers funds from one account associated with a portable consumer device to another account associated with another portable consumer device. For example, a value transfer may transfer funds from one credit card account to another credit card account.

The alias management and value transfer claim processing system may facilitate value transfers without exposing sensitive information, such as by using an alias, also referred to as a customer identity alias. As used herein, an "alias" may be an alpha-numeric value, such as a username, and may be static or dynamic. An alias may also comprise of Unicode characters or other CJK (Chinese, Japanese, Korean) characters. An alias may be used to identify a sending entity instead of sharing sensitive information, to preserve privacy and reduce the likelihood of fraud. An alias may be associated with one or more portable consumer devices or source accounts.

In a further embodiment, an alias may be a verifiable value, such as a phone number or an email address. The alias is verifiable if the alias value may be used to contact a user the alias represents. The user may be contacted for verification purposes. For example, a phone number and an email are verifiable aliases because the alias value indicates a method to contact a user, such as by SMS or email. For example, in a value transfer transaction, the sending entity may send money from the alias "ted@ted.com" rather than by presenting a credit card number.

In certain embodiments, an alias management and value transfer claim processing system enables a sending entity to conduct a value transfer to an unregistered recipient entity. The value transfer may be conducted without exposing a primary account number or other sensitive information by using an recipient entity alias. The unregistered recipient entity may be contacted about their waiting claim via a verifiable alias. The unregistered recipient entity may claim the value transfer by registering with the alias management and value transfer claim processing system. The registered alias may be used later to send or receive subsequent value transfers. For example, a sending entity may send a value transfer to the alias "ted@ted.com," which may be unregistered. The owner of "ted@ted.com" may then be contacted about the value transfer and respond to claim the value.

In other embodiments, the alias management and value transfer claim processing system enables the sending entity to send a value transfer to a registered recipient entity. The registered recipient entity may be identified via a registered alias, primary account number ("PAN," also known as a printed account number or permanent account number), or other identifier. For example, a sending entity may send a value transfer to the alias "ted@ted.com," which may be registered and associated with a destination account. A value transfer may then be processed in real time.

The alias management and value transfer claim processing system may also provide various value transfer supporting functions, such as anti-money laundering checks, account management tools, foreign exchange calculation, and fees calculations, among other functions to be described in detail later in the specification. Value transfers may be scheduled to occur in the future or on a reoccurring basis. Value transfers may also be conducted in real time and/or on a one-time basis.

The alias management and value transfer claim processing system may operatively communicate with various issuers to effectuate a value transfer between accounts hosted by the various issuers. For example, the alias management and value transfer claim processing system may communicate with a sending entity issuer to hold funds and to debit funds. The alias management and value transfer claim processing system may also communicate with the recipient entity issuer to credit value transfer funds.

The alias management and value transfer claim processing system may support value transfer functions through web exposed value transfer application programming interfaces ("APIs"). The various value transfer supporting functions may be called by an issuer, an originating institution, or other entity via the APIs. In an example embodiment, a sending entity may visit the website of an originating institution, such as a merchant website, and may initiate a value transfer from that website. The originating institution website may have embedded commands to call the alias management and value transfer claim processing system APIs to conduct the value transfer. In an example embodiment, the value transfer APIs may be called from any platform or device with internet access.

A software development kit ("SDK") for the alias management and value transfer claim processing system may be distributed to and implemented on issuer systems. The SDK may be adopted in whole or piecemeal to engage with existing issuer systems and may assist issuers in adopting and supporting value transfer functionality. The SDK may be a white-label implementation of the alias management and value transfer claim application and may be implemented in a turn-key solution or as a set of a la carte modules. The modules may be described in more detail in the discussion of FIG. 2. The SDK may be used to locally implement value transfer functionality at an issuer and may facilitate communication with the alias management and value transfer claim processing system APIs. The SDK may also be implemented with various entities other than issuers, such as on a merchant website, a social networking website, or other originating institutions, to support value transfer functionality from those originating institution systems. For example, a social networking site may integrate components of the SDK to support value transfer between its users or from its platform. The SDK may be implemented and branded to match the systems of the originating institution or issuer. For example, a website created from the SDK may be branded with the logos from an originating institution. The functionality of the alias management and value transfer claim processing system and the SDK is described in greater detail later in the specification and in FIG. 2.

The sending entity may initiate a value transfer by identifying the recipient entity. The sending entity may identify the recipient entity by providing a PAN, a general identifier, or a recipient entity alias. The sending entity may identify himself or herself by providing a PAN, an alias, a general identifier, or otherwise authenticating with the payment processing network. For example, a sending entity may authenticate by providing a password. In an example embodiment, the source account is implied from the sending entity's identity. The sending entity may also provide a transfer amount and identify a source account from which funds will be debited to fund the value transfer. The sending entity may provide the described data directly to a payment processing network or indirectly to the payment processing network through an originating institution, such as a bank, a merchant, etc. Hereinafter, messages described as sent directly between the sending entity and the payment processing network may also be understood to be sent from the sending entity to an originating institution and from the originating institution to the payment processing network. For example, a sending entity may communicate with a payment processing network to conduct a value transfer, or the sending entity may conduct a value transfer via merchant website and that further communicates with the payment processing network.

If the payment processing network determines that the recipient entity alias is registered or that the recipient entity PAN or identifier is valid, then a value transfer may be executed. Various anti-money laundering, fee determination, and blacklist functions may be conducted to mitigate risk and fraud, and to calculate debit and credit amounts. The sending entity and the payment processing network may operatively communicate to provide supplemental information and to signal acceptance of terms and conditions. Messages may be sent to the sending entity issuer to debit funds and further messages may be sent to the recipient entity issuer to credit funds to effectuate the value transfer.

However, if the recipient entity alias is not registered with the payment processing network, then a claim value transfer may be executed. In a claim value transfer, even though the recipient entity is not registered, the value transfer is approved and at least the transfer amount is reserved from the sending entity's account and held for the recipient entity to claim. Reserved funds may not be used for purposes other than the value transfer until the reserve is lifted. For example, the funds may be reserved by a hold, also known as a block, so that the held funds are available if and when the recipient entity claims them. Alternatively, the funds may be transferred to an intermediate escrow account. Reserved funds may be returned to the source account if the claim value transfer is not claimed within a predetermined amount of time of if the claim value transfer is canceled or otherwise is unable to complete. A claim value transfer may authorize a value transfer but does not settle it until the recipient entity claims the funds.

After reserving the funds, the payment processing network may send a registration request message via the recipient entity alias, such as via an e-mail address or a phone number, to inform the recipient entity of the reserved funds and their right to claim the funds. The recipient entity can then register with the payment processing network and claim the reserved funds. Upon receiving the recipient entity claim of the claim transfer, anti-money laundering and other checks are performed, and messages are sent to the respective sending entity issuer and recipient entity issuer to effectuate a value transfer. In an example embodiment, the subsequent operations mirrors that of a non claim value transfer.

The alias management and value transfer claim processing system may comprise of multiple modules to support value transfers. Such modules may support functionality such as alias management, reporting, anti-money laundering, blacklist support, user registration, fees and foreign exchange rate determination, notification, and other functions. These functions may be performed, in whole or in part at the payment processing network and/or at an issuer or originating institution, as a counterpart to the operations performed at the payment processing network.

I. Systems

FIG. 1 is an alias management and value transfer claim processing system 100, according to an example embodiment. The alias management and value transfer claim processing system 100 comprises a sending entity 102, an originating institution 103, a payment processing network 104, a database 105, an alias management and value transfer claim application 106, a recipient entity 107, a sending entity issuer 108, and a recipient entity issuer 110. Although only one sending entity 102, one originating institution 103, one payment processing network 104, one database 105, one alias management and value transfer claim application 106, one recipient entity 107, one sending entity issuer 108, and one recipient entity issuer 110 are shown, there may be any suitable number of any of these entities in the alias management and value transfer claim processing system 100.

The "sending entity" 102 may be a consumer that initiates a value transfer. The value transfer may use a portable consumer device or a source account as the funding source for the value transfer. The sending entity 102 may be an individual, an agent, an organization, such as a business, or other entity that is capable of initiating a value transfer.

As used herein "originating institution" 103 may refer to any suitable entity or entities that may support or provide a platform, system, or services that the sending entity 102 may use to initiate a value transfer with the payment processing network. The originating institution 103 may be a value transfer service provider. An originating institution 103 may interface with and call the alias management and value transfer claim processing APIs of the alias management and value transfer claim application 106. For example, the originating institution 103 may be a website operator with embedded components of the SDK that allows a sending entity 102 to perform a value transfer from the website. An originating institution 103 may call the value transfer APIs. The originating institution 103 may be a bank or issuer that hosts a website or other interface from which a sending entity 103 may send a value transfer. In an example embodiment, the originating institution 103 may be the same as the sending entity issuer 108.

The payment processing network 104 refers to a network of suitable entities that have information related to an account associated with a portable consumer device of the sending entity or recipient entity. This information includes data associated with the account on the portable consumer device such as profile information, account data, aliases, value transfer history, metadata, and other suitable information. The payment processing network 104 may also have information related to a source account not associated with a portable consumer device.

The payment processing network 104 may have or operate a server computer and may include a database 105. The database 105 may include any hardware, software, firmware, or combination of the preceding for storing and facilitating retrieval of information. Also, the database 105 may use any of a variety of data structures, arrangements, and compilations to store and facilitate retrieval of information. The database 105 may store information such a user profile, transfer history, and other value transfer related data. The server computer may be coupled to the database 105 and may include any hardware, software, other logic, or combination of the preceding for servicing the requests from one or more client computers. The server computer may use any of a variety of computing structures, arrangements, and compilations for servicing the requests from one or more client computers.

The payment processing network 104 may include data processing subsystems, networks, and operations used to support and deliver authorization services, exception file services, and clearing and settlement services. An exemplary payment processing network 104 may include VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 104 may use any suitable wired or wireless network, including the Internet.

The payment processing network 104 may comprise of an alias management and value transfer claim application 106. The alias management and value transfer claim application 106 may comprise of software modules and supporting hardware that provide value transfer functionality. For example, the alias management and value transfer claim application 106 may comprise of modules to manage alias management, send notifications, conduct anti-money laundering checks, etc. The alias management and value transfer claim application 106 may comprise of logic to conduct a value transfer. The alias management and value transfer claim application 106 may send and receive value transfer related messages. The alias management and value transfer claim application 106 is described in more detail in the discussion of FIG. 2.

The "recipient entity" 107 may be a consumer that is the intended recipient of a value transfer. The recipient entity 107 may be an individual, an agent, an organization, such as a business, or other entity capable of receiving funds. In an example embodiment, a recipient entity 107 may have an account with the payment processing network 104 and may have previously sent or received value transfers.

In another embodiment, a recipient entity 107 may not be registered with the payment processing network 104 and may have to register in order to claim a value transfer.

The "sending entity issuer" 108 may be any suitable entity that may manage or handle the funds of the sending entity 102. The sending entity issuer 108 may have issued, support, or may manage the portable consumer device or the source account of the sending entity 102. In an example embodiment, the sending entity issuer 108 is the issuing bank of the portable consumer device being used to fund the value transfer. For example, the portable consumer device may be a credit card issued by the sending entity issuer 108 that is used to fund the value transfer. The sending entity issuer 108 may be a bank, a business entity such as a retail store, or a governmental entity. The issuer 108 may provide value transfer services. In some situations, the sending entity issuer 108 may be the originating institution 103.

The "recipient entity issuer" 110 may be any suitable entity that may manage or handle the funds of the recipient entity 107. The recipient entity issuer 110 may have issued, support, or may manage the portable consumer device or the destination account of the recipient entity 107. In an example embodiment, the recipient entity issuer 110 is the issuing bank of the portable consumer device receiving the funds from the value transfer. For example, the recipient entity issuer 110 may have issued the credit card receiving the funds of the value transfer. The recipient entity issuer 110 may be a bank, a business entity such as a retail store, or a governmental entity. The recipient entity issuer 110 may provide value transfer services.

The sending entity 102 may be in operative communication with the payment processing network 104. The sending entity 102 may communicate with the payment processing network 104 to provide information in order to initiate and conduct a value transfer. The sending entity 102 may provide information such as a transfer amount, a recipient entity alias or PAN, and other information to complete a value transfer, such as an acceptance of terms and conditions. The send entity 102 may also self identify to the payment processing network 104 by providing a sending entity alias, PAN, identifier, or by authenticating with the payment processing network 104, such as by logging in or providing a password or other authentication data. The payment processing network 104 may respond to the sending entity's requests and may prompt the sending entity 102 for data related to completing the value transfer.

Similarly, the sending entity 102 may be in operative communication with the originating institution 103. The sending entity 102 may communicate with the originating institution 103 to provide information in order to conduct a value transfer. The sending entity 102 may provide information such as a transfer amount, a recipient entity alias or PAN, and other information to complete a value transfer. The send entity 102 may also self identify to the originating institution 103 by providing a sending entity alias, PAN, identifier, or by authenticating with the originating institution 103, such as by logging in or providing a password or other authentication data. The originating institution 103 may send to the sending entity 102 information that it receives from the payment processing network 104.

The originating institution 103 may also be in operative communication with the payment processing network 104. In an example embodiment, the originating institution 103 communicates with the payment processing network 104 to conduct a value transfer as requested by the sending entity 102. In an example embodiment, the data sent by the sending entity 102 to the originating institution 103 may be sent to the payment processing network 104.

The payment processing network 104 may be in operative communication with the database 105. The database 105 may be organized by a relational database management system. The database 105 may store value transfer data, such as user registration information, transaction history, alias and PAN data, and other data used in conducting a value transfer. The payment processing network 104 may store and access data stored on the database 105.

The payment processing network 104 may also be in operative communication with the recipient entity 107. In the case that the recipient entity 107 is not registered with the payment processing network 106, the payment processing network 104 may communicate to the recipient entity 107 that they may claim a value transfer. The recipient entity 107 may then indicate their desire to claim the funds and may register with the payment processing network 104. The payment processing network 104 may also communicate with the recipient entity 107 after the recipient entity is registered with the payment processing network 104, such as to notify them of subsequent value transfers.

The payment processing network 104 may communicate with the sending entity issuer 108 and the recipient entity issuer 110 to effectuate a value transfer. The payment processing network 104 may communicate with the sending entity issuer 108 a message to debit the value transfer funds from the source account of the sending entity 102. The payment processing network 104 may then communicate a credit message to the recipient entity issuer 110 to credit the value transfer funds into the destination account of the recipient entity 107. In an example embodiment, the credit message is a original credit transaction. In a further embodiment, the debit message is an account funding transaction. An account funding transaction may be a transaction initiated by a sending entity issuer or payment processing network on behalf of the sending entity that results in the debit of the sending entity's account. An original credit transaction may be a transaction that results in a credit to a recipient entity's account. The payment processing network 104 may also communicate with the sending entity issuer 108 to reserve funds for a claim value transfer—such as to place a hold or block on at least the transfer amount or to move such funds to an escrow account.

Communications between entities in the alias management and value transfer claim system 100 may be conducted via any combination of the web, a mobile network, an intranet, SMS, CSR/IVR, a plain old telephone system, email, USSD-2, APIs, tailored messages, a specialized application, or a communications network. For example, the sending entity 102 may initiate a value transfer with the payment processing network 104 via SMS and the payment processing network 104 may communicate with the issuers via the web.

Figure 2:
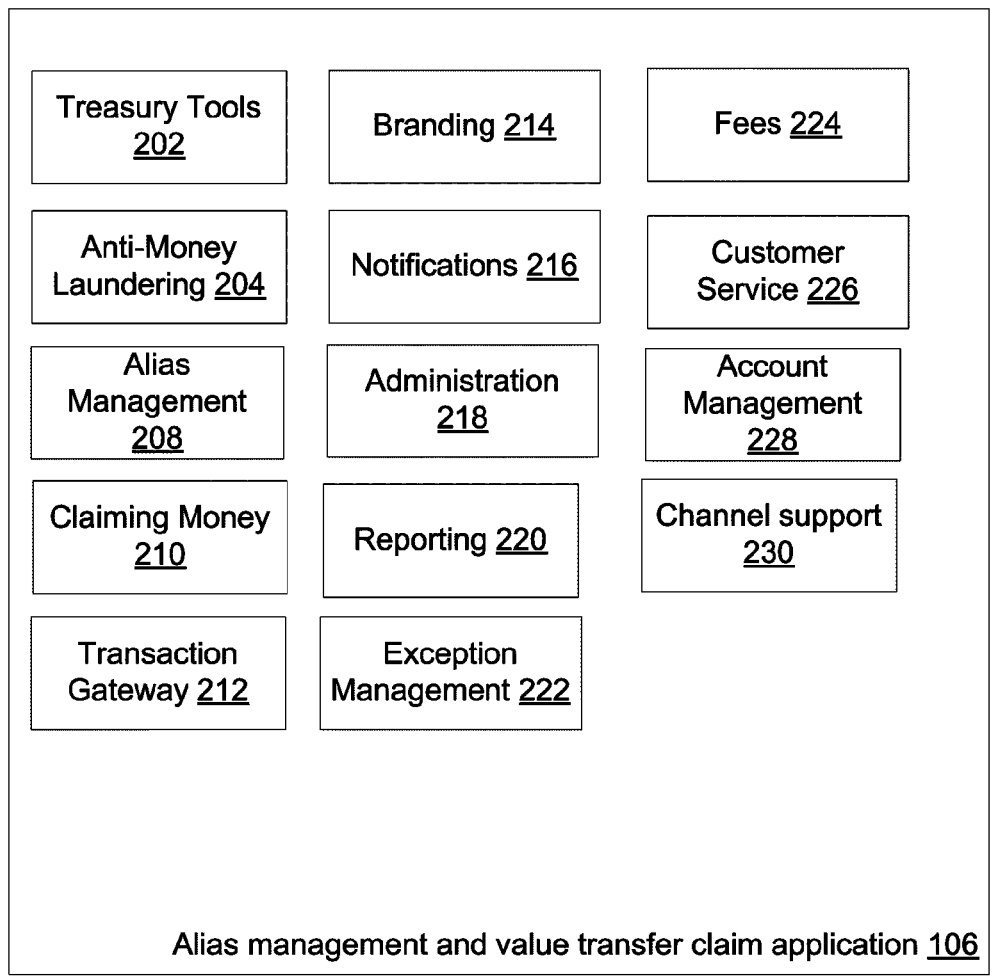
FIG. 2 is a block diagram of the modules of an alias management and value transfer claim application, according to an example embodiment.

FIG. 2 is a block diagram of the modules of an alias management and value transfer claim application 106, according to an example embodiment. The alias management and value transfer claim application 106 may comprise of various functional modules. The modules may comprise of treasury tool 202, anti-money laundering 204, alias management 208, claiming money 210, transaction gateway 212, branding 214, notifications 216, administration 218, reporting 220, exception management 222, fees 224, customer service 226, account management 228, and channel support 230 modules.

A treasury tool module 202 may provide currency lookup, foreign exchange rate lookup, and delivery amount determination functions. The currency lookup function may determine the currency of a recipient entity. In an example embodiment, the currency lookup function take as an input parameter the recipient entity PAN or alias and returns the currency code of the destination account. The treasury tool module 202 may use the recipient entity PAN to determine the destination account, or use the alias to determine a PAN to determine the destination account.

The foreign exchange rate lookup function may determine the foreign exchange rate between the sending entity and a recipient entity. In an example embodiment, the foreign exchange rate lookup function takes as input parameters the recipient entity PAN or alias and the sending entity PAN or alias. The treasury tool module 202 may then analyze the respective PAN or alias to determine the default currency supported. The foreign exchange rate lookup function may then return the recipient entity currency and the foreign exchange rate between the recipient entity currency and the sending entity currency. The foreign exchange rate may be determined from an external exchange, such as the London Exchange or the IMF, or from data native to the payment processing network 104. The foreign exchange rate may be adjusted with an issuers/originating institutions markup rate.

The delivery amount function may determine the amount of value that is delivered to a recipient entity. In an example embodiment, the delivery amount function takes as input parameters the recipient entity PAN or alias, the sending entity issuer BIN, and a transaction amount. The delivery amount function may determine the foreign exchange rate between the recipient entity currency and the sending entity currency and apply it to the transfer amount to determine the delivery amount. The delivery amount may be described in the currency of the recipient entity destination account. The delivery amount function may also take into consideration fees and foreign exchange markup rates to determine the delivery amount.

An anti-money laundering ("AML") module 204 may provide blacklist checks, blocked BIN/PAN checks, and value and velocity checks. The blacklist check function may determine if the sending entity is named on certain blacklists or watch lists. In an example embodiment, the blacklist check function takes as an input parameter the sending entity name. The AML module 204 may then determine if the sending entity name is present on any blacklist. Example blacklists may include the Office of Foreign Asset Control Specially Designed Nationals list. The function may return whether or not the sending entity name was found on a blacklist. The functions may also use "know your customer" data supporting anti-money laundering checks. The same checks may also be conducted on the recipient entity and recipient entity name. In an example embodiment, the anti-money laundering module 204 creates an AML and fraud score, based upon various data points including transaction history of both sending and recipient entity, and may provide the score to issuers. The score may also be an indication of risk, for which a threshold may be defined. The score may also be used by the anti-money laundering module 204 to determine whether to allow the value transfer.

A blocked BIN/PAN check may determine if a recipient entity BIN or PAN appears on certain blacklists. In an example embodiment, the blocked BIN/PAN check takes as input the recipient entity BIN or PAN and determines if it exists on any blacklist or if it is blocked. The check may return whether or not the recipient entity BIN/PAN was found on a blacklist. The same checks may also be conducted on the sending entity BIN/PAN. The BIN/PIN blacklists may be created by issuers or derived from data from credit agencies or other payment processing networks.

The value and velocity checks may determine if the velocity or value of transactions exceeds a certain threshold, so as to likely indicate fraud. In an example embodiment, the value and velocity checks take as input parameters the transfer amount, the sending entity PAN or alias, a transaction history, and the recipient entity PAN or alias. The velocity checks may determine if the number of transactions from a sending entity within a given time period exceeds a threshold. For example, there may be a velocity limit of six transactions per day, so that if a sending entity conducts more than six transfers within a day then the velocity check fails. Alternatively, the velocity checks may fail if a recipient entity receives more than a threshold number of transactions for a given time period. For example, velocity checks may fail if a recipient entity receives more than twenty transactions per day. Value checks may determine if the amount of value transferred from a sending entity within a given time period exceeds a threshold. For example, there may be a value limit of $10,000 USD per week, so that transactions from a sending entity that cause the sending entity to exceed $10,000 USD in a week may fail the check. Alternatively, value checks may fail if the amount a recipient entity receives exceeds a certain threshold within a give period of time. For example, there may be a value limit of $100,000 USD per week, so that transactions that cause a recipient entity to receive more than $100,000 USD per week may fail the check. More than one value or velocity check may be applicable simultaneously. Value checks may also be applied to single transactions. In an example embodiment, there may be a maximum and minimum transaction limit. For example, there may be a $10 minimum for any value transfer and a $1,000 maximum for a value transfer.

The alias management module 208 may provide logic to allow the sending of a value transfer using an alias and to allow the registration of an alias. The alias management module 208 may provide alias check and value transfer via alias functions. The alias check function may determine if an alias is registered. In an example embodiment, the alias check function may take as an input parameter an alias and return whether that alias is registered. The value transfer via alias function may allow a user to send a money transfer to an alias. In an example embodiment, the value transfer via alias function takes in as input a recipient entity alias and a transfer amount. If the alias is registered, it may be looked up in the database to derive a PAN. The alias management module 208 may also allow value transfers via an alias to be sent to an unregistered alias. In this case, the value transfer will be approved but not settled until the value is claimed. The alias management module 208 may also comprise of logic supporting scheduled and reoccurring value transfers.

The claim value module 210 may provide logic to allow the sending of a value transfer to an unregistered alias. The claim value module 210 may place a reserve on at least the transfer amount until the value is claimed or released. The hold may be placed by the claim value module 210 by sending a hold message to the sending entity issuer. Such a reserve may place a hold on the funds in the source account or may transfer the funds to an escrow account. The claim value module 210 may then comprise of logic to send a registration request message to the recipient entity alias informing them of value available to be claimed. Such a registration request message may comprise of the amount to be claimed, instructions to claim the money, and an expiration date for the claim. The instructions may comprise a URL, phone number, or other method to communicate with the alias management and money transfer claim application 106. In an example embodiment, the registration request message is sent to an unregistered recipient entity's email or phone number. The claim value module 210 may also cooperate with the account management module 228 to register a recipient entity and process their claim for value. For example, an unregistered recipient entity may visit a URL to register and to claim the funds by sending registration information, such as their name, alias, deposit account information, and portable consumer device information to the claim value module 210. In an example embodiment, a user may enroll or register a recipient only account, which permits them only to receive a value transfer. In a further embodiment, a user may enroll or register a full service account, which permits them to both send and receive value transfers from that account.

The transaction gateway module 212 may support messaging flows and gateway functionality supporting the processing of financial transactions. In an example embodiment, the transaction gateway 212 operatively communicates with issuers to send credit and debit messages. These messages may be original credit transaction messages and account funding transaction messages. The credit and debit messages may be modified to contain specific information to support the value transfer, such as alias and issuer information. In an example embodiment, if the value transfer fails, an AFT reversal may be sent to unwind the value transfer. In an example embodiment, an original credit transaction message may comprise of a processing code, a transaction code, a transaction code qualifier, a business application identifier, and a merchant category code. The processing code may be a 26 bit code containing payment processing network 104 data. The transaction may be a 6 bit code describing a BASE II transaction. The business application identifier may be two bits, and describe either a merchant initiated or bank initiated OCT.

The branding module 214 allows an issuer or an originating institution to create a co-branded site. The co-branded site may rely on the SDK or have functionality provided by the payment processing network 104 or the alias management and value transfer claim application 106. The branding module 214 may take as input the name and logo of the issuer or originating institution create a co-branded site. The branding module 214 may also allow customizations to the co-branded site, such as modifying layouts and default texts and images. Other customizable components include: terms and conditions, FAQs, contact information, and web and mobile web logos. The co-branded site may support various languages. For example, an issuing bank may support value transfer by using the branding module 214 to create a co-branded value transfer webpage from which its users may conduct value transfers.

The notifications module 216 may notify users of value transfers, account changes, and general notices and updates. The notifications module 216 may comprise of plugins that send notifications through various channels. The notification module 216 may operate with the channel support module 230. In an example embodiment, notifications module 216 may send messages via email or SMS. For example, notification may be sent when a value transfer has completed, when a claim is available, or when information related to an account has been changed.

The administration module 218 may allow administrative level access to the alias management and value transfer claim application 106. The administration module 218 may allow an issuer or originating institution to set the number and type of accounts permitted, the channels by which notifications may be sent, the level and frequency of reports, the fees and mark up rates, and the level of risk the anti-money laundering module 204 should allow. The administration module 218 may also allow an issuer or originating institution to set blacklists. Anti-money laundering rules, custom value and velocity values, and profile administration settings may also be customized through the administration module 218.

The reporting module 220 may provide reports on value transfers. The reporting module 220 may provide summary reports on a daily, weekly, monthly, or a user set time interval. The summary reports may summarize the value transfers sent. The summary reports may comprise of data describing the total number of debit and credit transactions. The summary reports may be broken down into the currency type (e.g., USD), the destination country, and the amount transferred. The summary reports may also describe the number of declined value transfers, the number of reversals, and other statuses. The reporting module 220 may also produce detailed reports. The detailed reports may provide information on an individual value transfer level, such as reporting the transaction ID, the date, the currency type, and the transaction amount. The reporting module 220 may also produce reports on transactions approved—including transactions in escrow or on hold and transactions that have been claimed. Reports on the transactions denied, charged back, settled, and approved but not settled may also be produced.

The exception management module 222 supports online dispute and chargeback processing. The exception management module 222 may present all disputed and charge backed transactions, the reason for its status, and automated tools to collect data from the alias management and value transfer claim application 106 to challenge the chargeback or disputed transaction.

The fees module 224 calculates fees for value transfers. The fees module 224 may determine fees by determine if it is domestic or foreign, by determining fees for different corridors, payment instruments, and applying valid incentives. The fees module 224 may also look into the settings of issuers and originating institutions to see if addition fees should be applied. The fees module 224 may also calculate national tariffs, taxes, surcharges, and other charges on transactions. The fees module 224 may also factor in cross-border foreign exchange markup rates imposed by issuers or originating institutions. In an example embodiment, the fees may be a domestic fixed amount, domestic transaction percentage, cross-border fixed amount, or cross-border transaction percentage.

The customer service module 226 provides tools, templates, and processes for managing customer support. The customer support module 226 may deliver administration capabilities to manage and direct customer service processes. It may provide a database of frequently asked questions and answers. It may also track customer service requests.

The account management module 228 may allow a user to manage their account settings. The account management module 228 may allow a user to adjust their alias, change their source or destination account, modify their default portable consumer device, or update account information. A user may also update their preferences, such as their preferred communication channel and change their default accounts for debits and credits. The account management module 228 may also permit a user to view their account settings and transaction history. In addition, a user may reset a PIN or password and add, edit, or delete contacts.

The channel support module 230 supports multiple communication channels. The channel support module 230 may allow the alias management and value transfer claim application 106 to communicate via multiple channels. The channels supported may comprise of mobile phone, internet, physical branch location, and ATM/kiosk. Other channels may include SMS, CSR/IVR, a plain old telephone system, USSD-2 or via a phone bank.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

Figure 3:
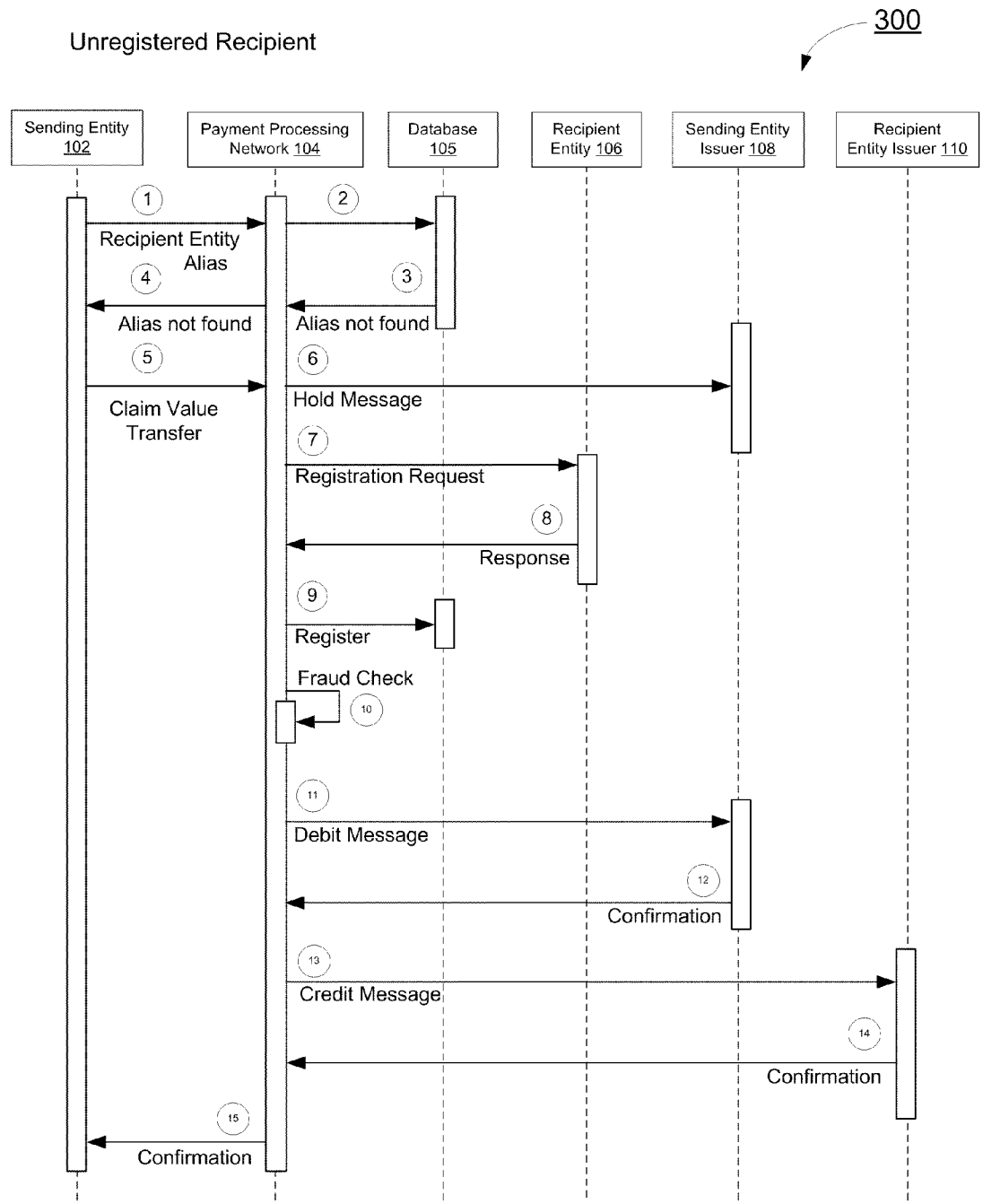
FIG. 3 is a process flow of a claim value transfer, according to an example embodiment.

FIG. 3 is a process flow of a claim value transfer, according to an example embodiment. At operation 1, the sending entity 102 initiates the money transfer by sending a value transfer request message to the payment processing network 104. The value transfer request message may comprise of the recipient entity alias. The value transfer request message may also comprise of a transfer amount and data identifying the sending entity, such as a sending entity identifier, sending entity alias, sending entity PAN, or other general identifier. The value transfer request message may also comprise of data identifying the source account or the portable consumer device from which the value transfer is funded. The sending entity may also include the recipient entity country of residence, the recipient's first and last name, and a personal message. In an example embodiment, the sending entity 102 may instruct the payment processing network 104 to create a reoccurring or scheduled value transfer. A reoccurring value transfer may repeat for a certain time frame, such as every Monday or every two weeks. A scheduled value transfer may be submitted now, but may not be processed, or funds may not be transferred, until the scheduled date arrives.

Upon receiving the value transfer request message, the payment processing network 104 queries the database 105 at operation 2 to determine if the recipient entity alias is registered. The database 105 queries for the recipient entity alias and at operation 3 sends a message to the payment processing network 104 indicating that the alias was not found and was not registered with the alias management with value transfer claim processing system 106 or the payment processing network 104. The payment processing network 104 receives the message from the database 105 indicating that the recipient entity alias was not registered and, at operation 4, informs the sending entity 102.

At operation 5, the sending entity 102 sends a message to the payment processing network 104 indicating that they wish to continue with a claim value transfer. In an example embodiment, the payment processing network 104 may present the sending entity with details about the claim value transfer. The details may include confirming the source account or portable consumer device, the sending entity's currency, the transfer amount, and an estimate of fees and foreign exchange rates, given the provided recipient entity nation of residence. These details may include a base exchange rate, a recipient entity currency, a foreign exchange markup percent or amount, a final rate, any fixed or percent fees, and the final amount to be transferred to the recipient entity. The payment processing network 104 may also present the claim code that will be sent to the recipient entity. In an example embodiment, the sending entity may override the system generated claim code and present a customized claim code. The sending entity 102 may review or edit these details and in operation 5, send a message to the payment processing network 104 indicating they wish to continue with the claim value transfer.

The payment processing network 104 receives the sending entity 102 confirmation to initiate a claim value transfer and at operation 6 sends a hold message to the sending entity issuer 108. The hold message instructs the sending entity issuer 108 to reserve at least the transaction amount. The reserve may ensure that at least the transaction amount is available for the value transfer should the recipient entity claim the funds. In an example embodiment, at least the transfer amount is held in the sending entity source account with a hold or block placed on those funds. In a further embodiment, at least the transfer amount is moved from the sending entity source account to an escrow account. The escrow account may be an account with the same issuer but associated with the payment processing network, the originating institution, or another entity. The escrow account may also be an account with a different issuer. The hold may also be placed for a total amount including the transfer amount and any associated transaction fees, markup rates, etc.

At operation 7, the payment processing network 104 sends a registration request message to the recipient entity 106. The registration request message may be sent to the recipient entity 106 via the recipient entity alias. In an example embodiment, if the recipient entity alias was an email, then the registration request may be sent via email. In another embodiment, if the recipient entity alias was a phone number, then the registration request message may be sent via SMS or by a phone call. The registration request message may be sent via a channel or process available to the recipient entity alias. For example, if the recipient entity alias is a Facebook account identifier, then the registration request message may be sent via Facebook message.

The registration request message may comprise of a message indicating that the recipient entity 106 may claim a value transfer. The message may indicate who sent the value transfer, when it was sent, and the transfer amount that may be claimed. The registration request message may also comprise the claim code and an expiration date of the claim code. The registration request message may also comprise of instructions indicating how the recipient entity 106 may claim the funds. The instructions may comprise of a URL linking to a website from which the recipient entity 106 may register. The instructions may also comprise of data indicating other methods for the recipient entity 106 to enroll, such as a phone number of an interactive voice response system or a customer service representative. The message may also comprise of a physical address, such as the address of an ATM or bank branch, from which the recipient entity 106 may register. The registration request message may also comprise of terms and conditions of the claim value transfer. The registration request message may also include fees and foreign exchange information, as described above. Also included may be explanatory verbiage indicating that the fees and exchange rates are an estimation that may change at the time of transfer.

At operation 8, after the recipient entity 106 receives the registration request message, the recipient entity 106 responds to the registration request by communicating a response message to the payment processing network 104. If the recipient entity 106 rejects the value transfer, then the funds that are reserved will be released. This may cause the hold or block on the funds to be lifted, or for the funds to be returned from the escrow account back to the sending entity source account. In an example embodiment, the funds are returned to the source account through a chargeback transaction or an AFT reversal. The payment processing network 104 may also communicate to the sending entity 102 that the value transfer was canceled.

If the recipient entity 106 claims the value transfer funds, then the recipient entity exchanges information with the payment processing network 104 to register. In an example embodiment, claiming and registration may be done via a specific URL for claiming the funds, or via a payment processing network website. To claim the funds, the recipient entity 106 may provide the claim code. The recipient entity 106 may also enter a CAPTCHA value and agree to presented terms and conditions of the claim value transfer. If the claim code and CAPTCHA input are valid, and the terms and conditions are agreed to, the recipient entity 106 may then present information about their portable consumer device or destination account. In registering, the recipient entity 106 may create an alias for themselves which may be used subsequently to send or receive value transfers. The recipient entity may also provide additional information to create a user profile, such as name, address, phone number, etc. At operation 9, the payment processing network 104 stores the recipient entity 106 registration information in the database 105. In an example embodiment, the account registered may be used to receive value transfers. In a further embodiment, the account registered may be used to send and receive value transfers.

At operation 10, the payment processing network 104 conducts fraud, anti-money laundering, and blacklist checks. Such checks may include velocity and value checks, which may limit the number of transactions or the transaction amount for a given period of time, for both the sending entity and the recipient entity. The velocity and value checks may apply domestic standards and cross-border standards. The cross-border standards may vary depending upon the nation from which funds originate and the nation which funds are being remitted into. The payment processing network 104 also may conduct blacklist checks, ensuring that neither the sending entity or recipient entity are on such lists. The lists may include governmental, issuer created, originating institution created, or other blacklists. These lists may block funds suspected of funding terrorism or other illicit activities. The payment processing network 104 may also analyze other data, such as know your customer data, geo-location data, payment instrument data, sending entity and recipient entity profile data, transaction history and other data in order to access the risk associated with the transaction. The other data may include data processed on other payment processing networks or payment gateways. If the fraud, anti-money laundering, and blacklists checks are passed, then the value transfer may proceed to operation 11. If the checks do not pass, then the value transfer may be canceled.

At operation 11, after the value transfer has passed the checks at operation 10, the payment processing network 104 sends a debit message to the sending entity issuer 108. The debit message may instruct the sending entity issuer 108 to debit at least the transfer amount from the source account of the sending entity 102 or an escrow account. The debit message may include calculated fees and other charges which may be added to the transfer amount to instruct the sending entity issuer 108 to debit a specific amount. All or some of the debited funds may be reserved—either held in the source account or in an escrow account. Any remaining funds may be debited from the source account. In an example embodiment, the debit message is an account funding transaction. At operation 12, the sending entity issuer 108 responds. If the sending entity issuer 108 rejects the debit message, then the value transfer is canceled and notification is send to the sending entity. The rejected value transfer data may be stored in the transaction history and the reserved funds unheld. If the sending entity issuer 108 accepts the debit message, the value transfer continues and sends a confirmation/authorization message to the payment processing network 104.

At operation 13, after receiving the confirmation of the debit, the payment processing network 104 sends a credit message to the recipient entity issuer 110. The credit message may instruct the recipient entity issuer 110 to credit the transfer amount to the destination account of the recipient entity 106. If the credit message is rejected, then the recipient entity issuer 110 communicates the rejection to the payment processing network 104 which may cancel the value transfer and notify the sending entity 102. The rejected value transfer data may be stored in the transaction history. If the credit is successful, then at operation 14, the recipient entity issuer 110 sends a confirmation/authorization message to the payment processing network 104. At operation 15, the payment processing network 104 sends a confirmation message to the sending entity 102 indicating that the value transfer was successful.

After a successful value transfer, information about the value transfer may be stored in the sending entity and recipient entity transaction history. Such information may include the timestamp of the value transfer initiation and completion, the amount transferred, and other data.

The sending entity may also cancel a claim value transfer any time before the recipient entity claims the funds. If a transaction is canceled or does not complete, an AFT reversal message may be sent to the sending entity issuer to return funds to the source account.

Figure 4:
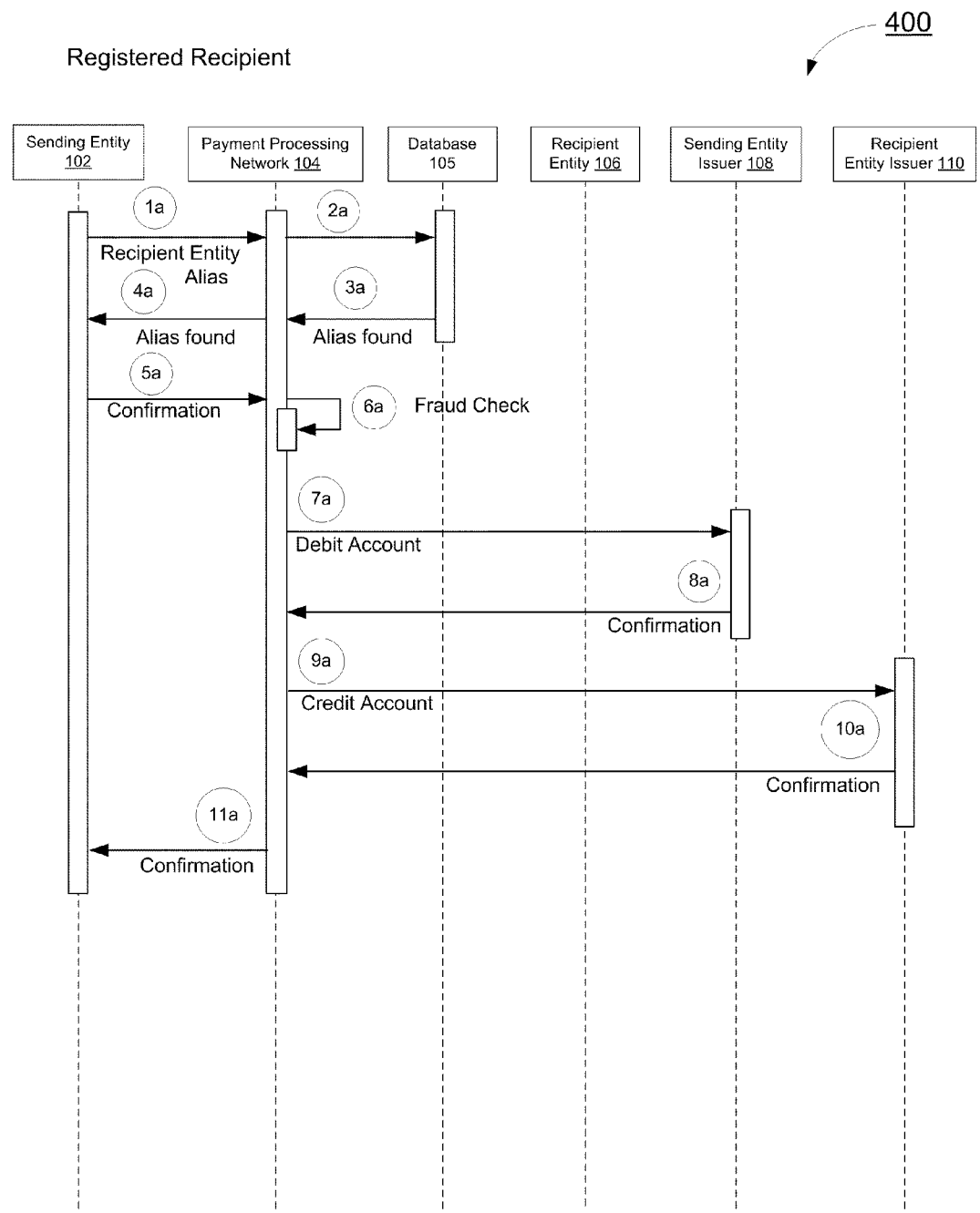
FIG. 4 is a process flow of a value transfer to a registered recipient entity, according to an example embodiment.

FIG. 4 is a process flow of a value transfer to a registered recipient entity, according to an example embodiment. In this case, the sending entity 102 may identify the recipient entity 106 through a registered alias or valid PAN. At operation 1*a*, the sending entity 102 initiates the money transfer by sending a value transfer request message to the payment processing network 104. The value transfer request message may comprise of the recipient entity alias or the recipient entity PAN. The value transfer request message may also comprise of a transfer amount and data identifying the sending entity, such as a sending entity identifier, sending entity alias, sending entity PAN, or other general identifier. The value transfer request message may also comprise of data identifying the source account or the portable consumer device from which the value transfer is funded. The sending entity may also include the recipient entity country of residence, the recipient's first and last name, and a personal message.

Upon receiving the value transfer request message, the payment processing network 104 queries the database 105 at operation 2*a* to determine if the recipient entity alias is registered or if the recipient entity PAN is valid. The database 105 queries for the recipient entity alias/PAN and at operation 3*a* sends a message to the payment processing network 104 indicating that the alias was found or that the PAN is valid. The payment processing network 104 receives the message from the database 105 and, at operation 4*a*, informs the sending entity 102 that the recipient entity has been identified.

At operation 5*a*, the sending entity 102 sends a message to the payment processing network 104 indicating that they wish to continue with a value transfer. In an example embodiment, the payment processing network 104 may present the sending entity with details about the value transfer before the sending entity indicates they wish to continue. The details may include confirming the source account or portable consumer device, the sending entity's currency, the transfer amount, and an estimate of fees and foreign exchange rates, given the provided recipient entity nation of residence. These details may include a base exchange rate, a recipient entity currency, a foreign exchange markup percent or amount, a final rate, any fixed or percent fees, and the final amount to be transferred to the recipient entity. The payment processing network 104 may also present the claim code that will be sent to the recipient entity. In an example embodiment, the sending entity may override the system generated claim code and present a customized claim code. The sending entity 102 may review or edit these details and in operation 5*a*, send a message to the payment processing network 104 indicating they wish to continue with the claim value transfer.

The payment processing network 104 receives the sending entity 102 confirmation to initiate a value transfer and at operation 6*a* conducts fraud, anti-money laundering, and blacklist checks. Such checks may include velocity and value checks, which may limit the number of transactions or the transaction amount for a given period of time, for both the sending entity and the recipient entity. The velocity and value checks may apply domestics standards and cross-border standards. The cross-border standards may vary depending upon the nation from which funds originate and the nation which funds are being remitted into. The payment processing network 104 also may conduct blacklist checks, ensuring that neither the sending entity or recipient entity are on such lists. The lists may include governmental, issuer created, originating institution created, or other blacklists. These lists may block funds suspected of funding terrorism or other illicit activities. The payment processing network 104 may also analyze other data, such as know your customer data, geo-location data, payment instrument data, sending entity and recipient entity profile data, transaction history and other data in order to access the risk associated with the transaction. The other data may include data processed on other payment processing networks. If the fraud, anti-money laundering, and blacklists checks are passed, then the value transfer may proceed to operation 7*a*. If the checks do not pass, then the value transfer may be canceled.

At operation 7*a*, after the value transfer has passed the checks at operation 10, the payment processing network 104 sends a debit message to the sending entity issuer 108. The debit message may instruct the sending entity issuer 108 to debit at least the transfer amount from the source account of the sending entity 102 or an escrow account. The debit message may induce the calculation of fees and other charges which may be added to the transfer amount to instruct the sending entity issuer 108 to debit a specific amount. All or some of the debited funds may be reserved—either held in the source account or in an escrow account. In an example embodiment, the debit message is an account funding transaction. At operation 8a, the sending entity issuer 108 responds. If the sending entity issuer 108 rejects the debit message, then the value transfer is canceled and notification is send to the sending entity. If the sending entity issuer 108 accepts the debit message, the value transfer continues and sends a confirmation/authorization message to the payment processing network 104.

At operation 9a, after receiving the confirmation of the debit, the payment processing network 104 sends a credit message to the recipient entity issuer 110. The credit message may instruct the recipient entity issuer 110 to credit the transfer amount to the destination account of the recipient entity 106. If the credit message is rejected, then the recipient entity issuer 110 communicates the rejection to the payment processing network 104 which may cancel the value transfer and notify the sending entity 102. If the credit is successful, then at operation 10a, the recipient entity issuer 110 sends a confirmation/authorization message to the payment processing network 104. At operation 11a, the payment processing network 104 sends a confirmation message to the sending entity 102 indicating that the value transfer was successful.

Figure 5A:
FIG. 5a is a screenshot of an alias management and value transfer application, according to an example embodiment.

FIG. 5a is a screenshot of a value transfer application, according to an example embodiment. This application may be provided from the payment processing network or through an originating institution. The screenshot comprises a window that prompts for a "SEND TO" value identifying a recipient entity, a personal message, and an amount. The screenshot also identifies the source account.

Figure 5B:
FIG. 5b is a screenshot of an alias management and value transfer application populated with sample data, according to an example embodiment.

FIG. 5b is a screenshot of a value transfer application populated with sample data, according to an example embodiment. The application of FIG. 5a is populated with a "SENT TO" value of an email alias, a personal message, and a value. The recipient entity may be registered to indicate that their destination account currency is different from the source account currency. In this instance, the application may calculate a foreign exchange rate and derive a delivery amount by applying the foreign exchange amount to the transfer amount. The screenshot of FIG. 5b also shows a transaction history of previous value transfers.

Figure 6:
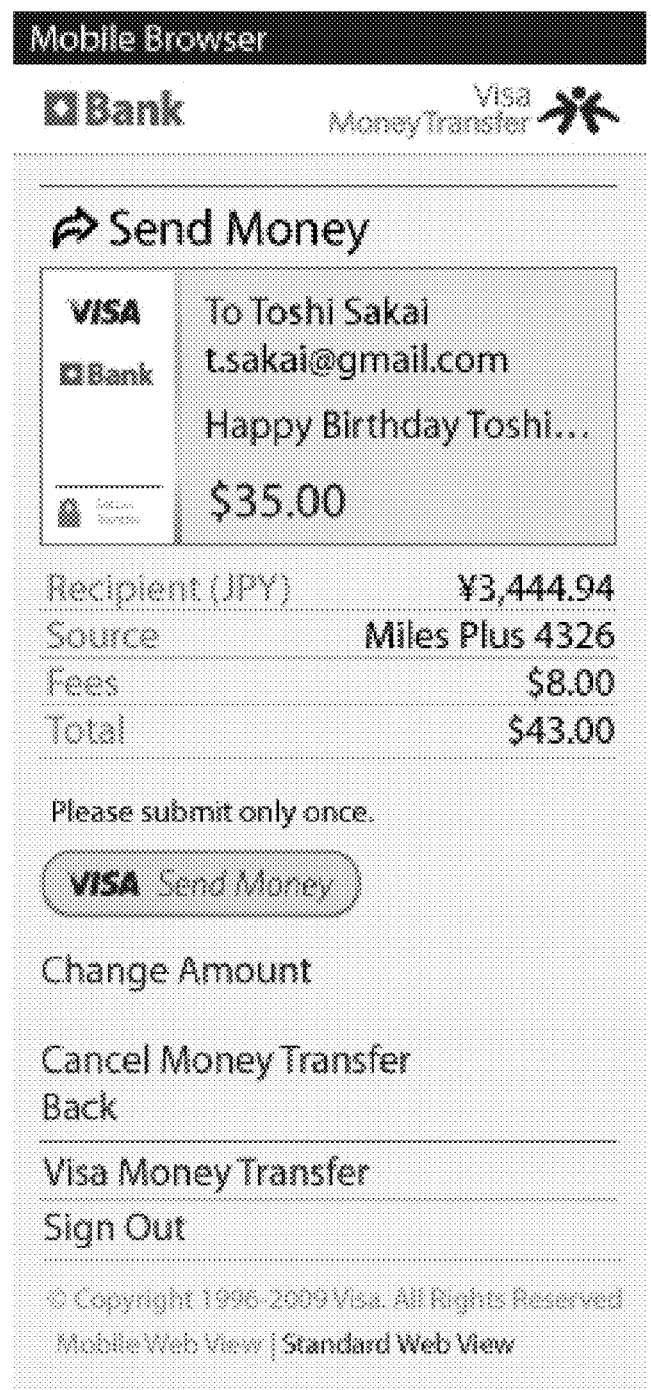
FIG. 6 is a screenshot of a mobile alias management and value transfer application, according to an example embodiment.

FIG. 6 is a screenshot of a mobile value transfer application, according to an example embodiment. The mobile value transfer application may be accessed from a portable device, such as a mobile phone. The application may be a website accessed through the mobile web or an application that contacts the payment processing network. In this screenshot, the recipient entity is identified using an alias, and the transfer amount is indicated as $35 USD. The application determines that the destination account has a currency of the Japanese yen and applies a foreign exchange rate to determine a delivery amount in yen. The source account is also identified as "Miles Plus 4326." The application also calculates fees applicable to the value transfer and determines the total amount to be debited from the source account.

Figure 7:
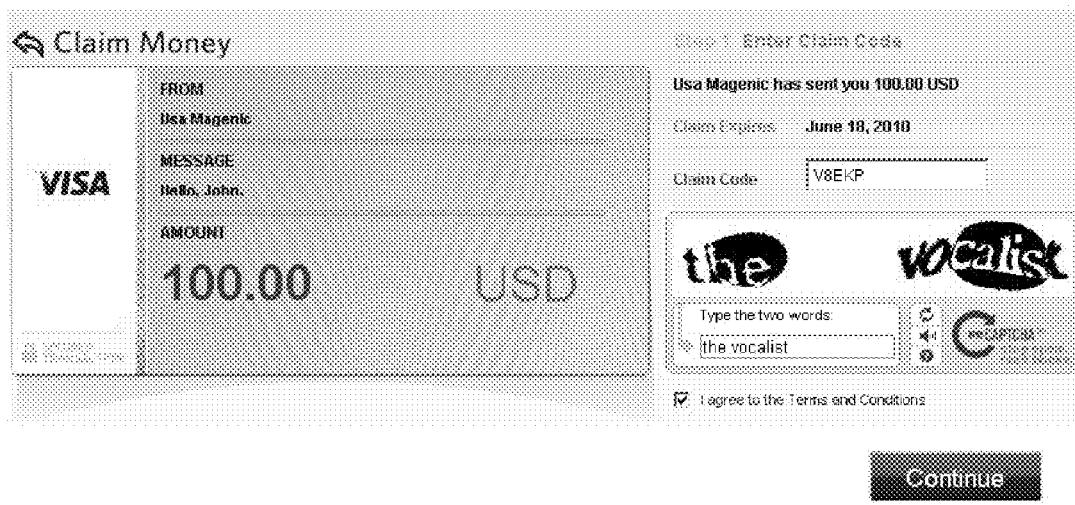
FIG. 7 is a screenshot of a confirmation code entry form, according to an example embodiment.

FIG. 7 is a screenshot of a confirmation code entry form, according to an example embodiment. This screenshot may be shown to a recipient entity of a claim value transfer. The recipient entity, after registering with the payment processing network, may enter the claim code they received via their alias in the form to claim the money transfer. The claim code may be entered via a website, mobile web, SMS, CSR, or other channel or method.

Figure 8:
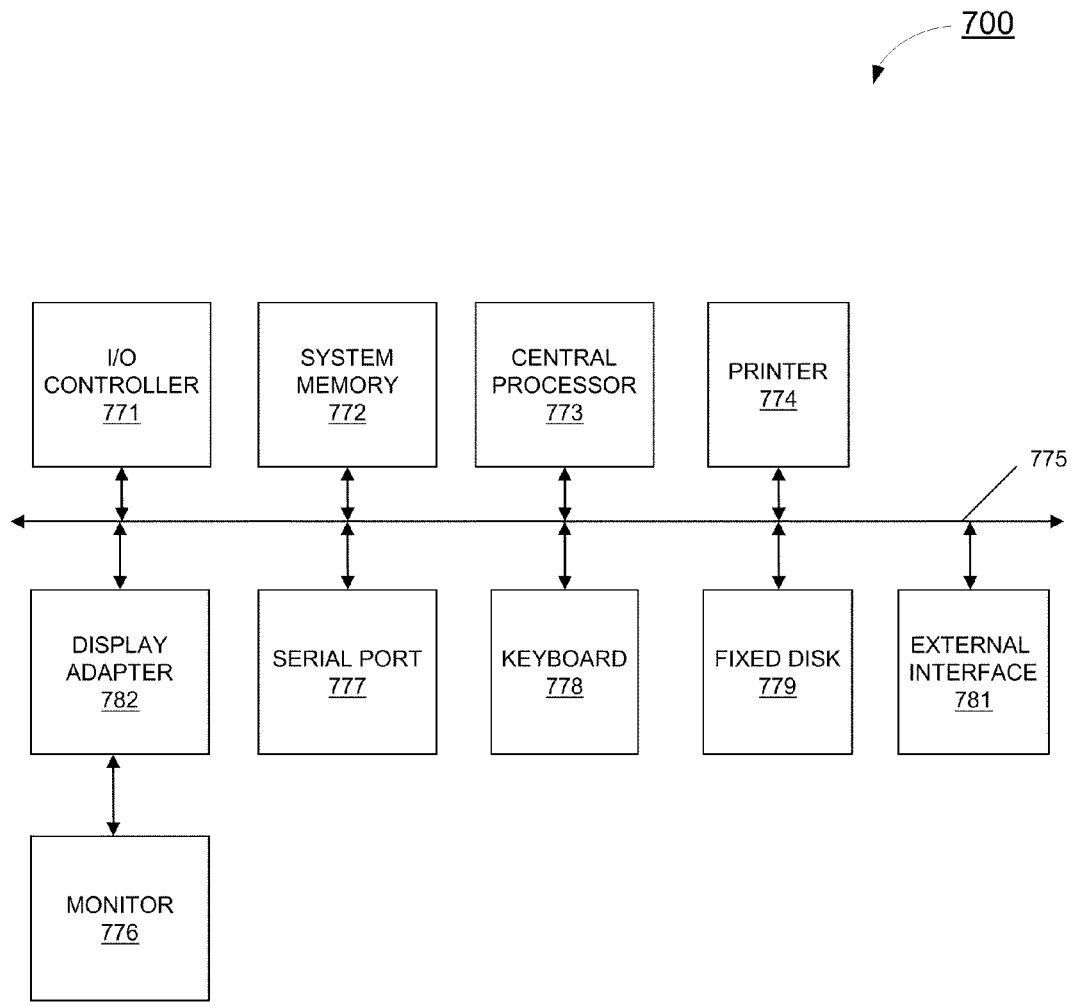
FIG. 8 is a diagram of a computer apparatus, according to an example embodiment, according to an example embodiment.

FIG. 8 is a diagram of a computer apparatus, according to an example embodiment. The various participants and elements in the previously described system diagrams (e.g., the payment processing network, sending entity issuer, recipient entity issuer, originating institution, etc. in FIGS. 1, 2, 3, 4, 5, 6, 7) may use any suitable number of subsystems in the computer apparatus to facilitate the functions described herein. Examples of such subsystems or components are shown in FIG. 8. The subsystems shown in FIG. 8 are interconnected via a system bus 775. Additional subsystems such as a printer 774, keyboard 778, fixed disk 779 (or other memory comprising computer-readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer-readable medium.

Embodiments of the alias management and money transfer claim processing system may provide several advantages over existing systems. The alias management and money transfer claim processing system may allow the sending entity to authenticate without disclosing any sensitive information, such as a credit card number or PAN. The alias management and money transfer claim processing system may also provide various anti-money laundering, fees determination, and other supporting functions helpful to value transfers. The alias management and money transfer claim processing system also provides a SDK package and API support, which encourages the adoption of the alias management and money transfer claim processing system with issuers and increases the likelihood such functionality may be incorporated into third party originator systems. The authorize and hold method also allows a value transfer to be authorized and sent to an unregistered alias. This increases the utility of the overall value transfer system, encourages unregistered recipient to register and subsequently use the system, and guarantees that unregistered recipient entities have assurance that funds will be available for them to claim.

The alias management and money transfer claim processing method may also be described from the perspective of the sending entity. The sending entity may send, using one or more processors, a value transfer request message comprising a recipient entity alias, a transfer amount, and a sending entity identifier. The value transfer request message may be sent to a payment processing network. The sending entity may receive a message indicating that the recipient entity alias is not registered and in response may send an approval message to approve continuing with a value transfer to an unregistered alias. The sending may then receive a value transfer confirmation message confirming that a registration request message was sent to a recipient entity and a hold message was sent to a sending entity issuer to reserve at least the transfer amount from a sending entity source account identified by the sending entity identifier.

The alias management and money transfer claim processing method may also be described from the perspective of the sending entity issuer. The sending entity issuer may receive a hold message requesting that a hold be placed for at least the transfer amount on the source account of the sending entity. Later, the sending entity issuer may receive a message releasing the hold, such as if the value transfer failed to complete. The sending entity issuer may also receive a debit message, or an OCT, debiting at least the transfer amount from the source account of the sending entity. The sending entity issuer may send a confirmation message to the payment processing network if the debit was successful.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

What is claimed is:

1. A method comprising:
   receiving, by a payment processing network server computer, a value transfer request message from a sending entity, the value transfer request message comprising a recipient entity alias, a transfer amount, and a sending entity identifier;
   determining, by the payment processing network server computer, that the recipient entity alias is not registered with the payment processing network server computer; and
   sending, by the payment processing network server computer, a registration request message to a recipient entity associated with the recipient entity alias requesting the recipient entity to register with the payment processing network server computer; and
   sending, by the payment processing network server computer, a hold message, to a sending entity issuer associated with the sending entity identifier, to reserve at least the transfer amount from a sending entity source account identified by the sending entity identifier.

2. The method of claim 1, further comprising upon receiving a response message from the recipient entity, performing the operations of:
   sending a debit message to the sending entity issuer to debit at least the transfer amount from the sending entity source account; and
   sending a credit message to a recipient entity issuer to credit the transfer amount to a recipient entity destination account.

3. The method of claim 1, wherein the transfer amount is held in the sending entity source account.

4. The method of claim 1, wherein the transfer amount is held in an escrow account.

5. The method of claim 1 further comprising removing the reservation on the funds from the sending entity account if no response message from the recipient entity is received by a pre-determined amount of time.

6. The method of claim 1 further comprising:
   receiving, by the payment processing network server computer, a response message from the recipient entity, the response message including information to be used for registering the recipient entity.

7. The method of claim 1, wherein the recipient entity alias is an email address and the recipient entity is contacted via the recipient entity alias.

8. The method of claim 1, wherein the recipient entity alias is a phone number and the recipient entity is contacted via the recipient entity alias.

9. The method of claim 1, wherein the sending entity issuer and a recipient entity issuer are derived from the sending entity identifier and the recipient entity alias, respectively.

10. The method of claim 2, wherein the debit message is an account funding transaction message and the credit message is an original credit transaction message.

11. The method of claim 1, further comprising upon receiving a response message from the recipient entity performing velocity amount and anti-money laundering checks on the recipient entity and a sending entity identified by the sending entity identifier.

12. A non-transitory computer readable medium comprising code that when executed by a processor performs the method of claim 1.

13. A method comprising
sending, by a sending entity server computer, a value transfer request message to a payment processing network server computer, the value transfer request message comprising a recipient entity alias, a transfer amount, and a sending entity identifier, wherein (a) the recipient entity alias is associated with a recipient entity and (b) the sending entity identifier is associated with a sending entity;
receiving, by the sending entity server computer, a message indicating that the recipient entity alias is not registered;
sending, by the sending entity server computer, an approval message to the payment processing network server computer, the approval message indicating an approval for a value transfer to an unregistered alias; and
receiving, by the sending entity server computer, a value transfer confirmation message confirming that a registration request message was sent to a recipient entity and a hold message was sent to a sending entity issuer to reserve at least the transfer amount from a sending entity source account identified by the sending entity identifier.

14. The method of claim 13, further comprising receiving a completion message confirming the debit of at least the transfer amount from the sending entity source account and the credit of the transfer amount to a recipient entity destination account.

15. A system comprising
a processor; and
a computer-readable medium coupled to the processor, the computer readable medium comprising code executable by the processor for implementing a method comprising:
receiving a value transfer request message comprising a recipient entity alias, a transfer amount, and a sending entity identifier;
determining if the recipient entity alias is registered;
if the recipient entity alias is not registered, sending a registration request message to a recipient entity and sending a message to a sending entity issuer to reserve at least the transfer amount from a sending entity source account identified by the sending entity identifier, and upon receiving a response message from the recipient entity, performing the operations of:
sending a debit message to the sending entity issuer to debit at least the transfer amount from the sending entity source account; and
sending a credit message to a recipient entity issuer to credit the transfer amount to a recipient entity destination account.

16. The system of claim 15, wherein the transfer amount is held in the sending entity source account.

17. The system of claim 15, wherein the transfer amount is held in an escrow account.

18. The system of claim 15 further comprising reversing the reservation on the funds from the sending entity account if no response message from the recipient entity is received within a pre-determined amount of time.

19. The system of claim 15, wherein the debit message is an account funding transaction message and the credit message is an original credit transaction message.

20. The system of claim 15, wherein the response message comprises information that registers the recipient entity.

* * * * *